3,332,934
TRIALKYLOLAMINE POLYETHER POLYOLS
Robert E. Booth and Edward R. Degginger, Syracuse,
N.Y., assignors to Allied Chemical Corporation, New
York, N.Y., a corporation of New York
No Drawing. Filed May 21, 1965, Ser. No. 457,861
4 Claims. (Cl. 260—209)

This invention relates to polyurethane foam and, more particularly, to rigid polyether polyurethane cellular plastic material and to certain polyether compositions for production of rigid urethane foam.

Polyether-urethane foams are expanded cellular materials formed by reacting a polyether glycol with an aromatic polyisocyanate, usually tolylene diisocyanate. These rigid urethane foams are particularly useful for foamed-in-place applications such as thermal insulation, sandwich construction, building panels, flotation chambers in ships, and numerous other structural parts. To meet the requirements of these applications, the foamed product must possess outstanding chemical, physical, and mechanical properties, the physical characteristics and mechanical properties of the foam being primarily controlled by the structure and molecular size of the polyether. Many of the rigid foam grade polyethers offered on the market have been based on low molecular weight trihydroxy compounds such as trimethylolpropane and trishydroxylphenylpropane, which, in the foaming reaction with diisocyanate, produce rigid foams. Such foams have been found to have inferior dimensional stability in humid heat tests and exhibit a tendency to melt when burned. This property causes dripping and spreads flaming polymer increasing the fire hazard. Considerable investigation has been carried out to improve these properties and, also, to lower the cost for initial materials in the polyurethane field. The latter meant either providing cheaper materials or eliminating the need for certain materials. In the same vein, investigators attempted to make inroads on the process for preparing the polyethers, which, in brief, comprised reacting alkylene oxides with an initiator such as those mentioned above, in the presence of a basic catalyst, e.g., sodium or potassium hydroxide; however, they were unable to avoid the use of catalysts per se; they could not eliminate the complicated refining step which included neutralization of the catalyst, digestion and precipitation of salts, additional stripping steps for removal of water, and filtration; and they could not markedly reduce reaction times. Of course, the investigators were limited by the necessity for keeping the polyether processes within the framework of existing plants and equipment or else any economies gained might be lost.

An object of the present invention is to provide rigid urethane foams having desirable properties prepared from efficiently and economically produced polyethers. Another object is to provide a polyether polyol composition suitable for producing rigid foams with adequate dimensional stability. A further object is to provide an efficient and economical process for preparing polyethers, which avoids the use of a catalyst per se, eliminates the refining step, reduces reaction times, and which can be carried out with existing plants and equipment.

Other objects and advantages will be apparent from the following description.

In accordance with the present invention a polyether polyol composition adapted for the production of rigid polyurethane foams having desirable properties including suitable dimensional stability can be prepared by a process comprising admixing a co-initiator selected from the group consisting of sucrose, sorbitol, and alpha-methyl glucoside with triethanolamine in the proportion of about 55 to about 575 parts by weight co-initiator to about 100 parts by weight triethanolamine, passing propylene oxide in direct contact with said mixture of co-initiator and triethanolamine while maintaining the mixture at a temperature within the range of about 60° C. to about 140° C., and continuing the procedure until a polyether polyol composition having a hydroxyl number from about 400 to about 600 is obtained.

Preferred values for proportions of co-initiator to triethanolamine are about 140 to about 415 parts by weight co-initiator per 100 parts by weight triethanolamine; for temperatures of reaction are about 70° C. to about 100° C.; and for hydroxyl numbers are about 450 to about 550. Suggested amounts of propylene oxide are about 120 parts by weight to about 790 parts by weight propylene oxide per 100 parts by weight triethanolamine and, preferably, about 280 parts to about 585 parts per 100 parts triethanolamine.

The foams produced from this polyether polyol composition using the usual grade of diisocyanate are high quality, having physical properties equal to or exceeding foams from other sources. The foams are unaffected by fats, grease and oils. They have no nutritive value and consequently are not attacked by rodents and insects. These foams have eminently desirable, yet uncommon, characteristics when subjected to fire in that they are non-melting. Like other rigid urethane foams, they are combustible; however, their unique non-melting property prevents the dripping of flaming melted polymer when burned. The heat of a flame is necessary to start the burning.

The polyethers of the present invention can be prepared by charging a reactor with triethanolamine and then incrementally adding the co-initiator to the triethanolamine in the reactor while agitating the contents. Charging of the co-initiator can usually be accomplished in 30 minutes or less with rapid mechanical agitation. The amount of co-initiator introduced into the reactor is preferably greater than the amount of triethanolamine. Propylene oxide is introduced into the mixture and reacts therein to form the polyether composition. The reaction is initiated at a relatively low temperature and proceeds at an appreciable rate at a temperature as low as 60° C. Temperatures up to 140° C. can be employed. The operation can be conveniently carried out under substantially atmospheric pressure although superatmospheric pressure can be used if desired. The reactivity of the propylene oxide with the reactants is quite rapid such that usually all of the propylene oxide introduced into the reaction mixture is absorbed.

A feature of this invention is that in the preparation of the subject polyethers, any problem that might arise because of the presence of water is avoided. This is not true of processes where alkali metal hydroxide catalysts are used.

The apparatus for carrying out the reaction producing the polyethers of the present invention can take several forms. In a typical procedure the polyethers can be prepared in a vertical column reactor charged with triethanolamine and purged with nitrogen. The material in the column is heated and at a low temperature of about 60° C. propylene oxide feed is started with introduction through the bottom of the reactor. This gives the necessary agitation due to the turbulence of the rising propylene oxide vapor. The co-initiator is then added at a rate that enables the agitation to maintain a slurry and prevent the settling of the co-initiator. Temperature is maintained at about 80° C., by control of the external heaters on the vertical reactor, and the co-initiator addition is generally completed in less than about 30 minutes. The propylene oxide addition is continued until the desired amount has been added. This can be determined by actual measurement of the volume of polyether during the course of the reaction. The time of reaction ranges from about 7 to about 20 hours. The crude polyether is then stripped with a stream of nitrogen at about 80° C. to remove unreacted propylene oxide. If solids are still present at the end of the reaction period and after nitrogen stripping, the reaction mass is cooled to room temperature, treated with acetone and filtered. The acetone is then distilled off at about 80° to about 100° C. under absolute pressure of about 20 to about 30 mm. Hg. The polyether is finally stripped with nitrogen at about 80° to about 125° C. to remove all traces of volatile materials.

In another typical procedure, a kettle reactor with a circulating stream is used. Triethanolamine is added and the charge is kept at about 80° C. by means of a heat exchanger and a pump circulating liquor thru the heat exchanger. This pump also provides the agitation in the reactor. A co-initiator is then added incrementally at such a rate that circulation can be maintained and a final thick slurry is obtained. This generally requires about 30 minutes. The reactor is then purged with nitrogen. Propylene oxide is added and the temperature of the reaction mass is maintained at about 80° C. at pressures up to 20 p.s.i.g. Time of addition is about 7 to about 20 hours depending upon the hydroxyl number desired. Cooling is done by circulating thru a heat exchanger or by vaporizing an excess feed of propylene oxide thru the reaction mixture. After the desired hydroxyl number is reached, as determined by actual test or on the basis of the weights of ingredients added, the crude polyether is stripped with nitrogen to remove unreacted propylene oxide and filtered thru a filter press without solvent. After filtration, the product is treated with an antioxidant such as 0.2% 2,6-di-tert-butyl-4-methylphenol.

Foamed rigid polyether-urethanes of the present invention are formed in accordance with what is now conventional practice for producing rigid urethane foams by reacting an aromatic isocyanate with the polyether composition in the presence of various adjuvants such as blowing agents, activators or catalysts, acid dispersing agents or emulsifiers. The foams can be made by the one-shot technique using either a volatile fluorocarbon or carbon dioxide generated by the reaction of water with diisocyanate as the blowing agent. The foams can also be produced by the quasi prepolymer technique wherein a quasi prepolymer is first prepared by reaction of isocyanate with a portion of the polyether and this quasi prepolymer subsequently admixed with additional polyether and adjuvants to form the foam.

Examples of suitable blowing agents for use in the present invention include carbon dioxide (produced by the in situ reaction of water and polyisocyanate) and, preferably, certain halogenated aliphatic saturated hydrocarbons. Mixtures of these can be and are sometimes used. The preferred blowing agents are characterized by being liquids or gases at normal temperatures and pressures, poor solvents for the resulting urethane foam, and boiling at temperatures below that generated by the polyurethane formation reactions. They, preferably, have a significant solubility in the aromatic polyisocyanate and when in the gaseous state they do not readily diffuse thru the walls of closed cells of the rigid polyurethane foam. Such fluorocarbons are exemplified by the following specific compounds: monofluorotrichloromethane, dichlorodifluoromethane, monochlorotrifluoromethane, 1,1 - dichloro-2-fluoroethane, 1,1-difluoroethane, and 1,1,2-trichloro-1,2,2-trifluoroethane.

A preferred isocyanate for use in the present invention is tolylene diisocyanate, preferably a mixture of isomers, because of its low cost and availability. Other aromatic isocyanates can also be employed, examples of which are diphenyl diisocyanate, triphenyl diisocyanate, chlorophenyl-2,4-diisocyanate, p-phenylene diisocyanate and p,p'-diisocyanato diphenylmethane. Another preferred isocyanate is the tolylene diisocyanate composition used in the examples.

Suitable activators or catalysts for use in preparing the foams described in this invention include: (1) organo-tin compounds of the general formula

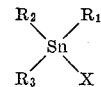

wherein X represents a hydrocarbon alkane radical of from 1 to 18 carbons, $R_1$, $R_2$ and $R_3$ represent a hydrocarbon alkane radical of from 1 to 18 carbons, hydrogen, halogen or a hydrocarbon acyl group, $R_1$, $R_2$ and $R_3$ being alike or different and further, two members of this group $R_1$, $R_2$ and $R_3$ together being oxygen or sulfur. Representative members of this group of organo-tin salts include the following specific compounds: tetramethyltin, tetra-n-butyltin, tetra-octyltin, dimethyldioctyltin, triethyltinchloride, dioctyltindichloride, di-n-butyltindichloride, dilauryltindifluoride, 2-ethylhexyltintriiodide, di-n-octyltin oxide, di-n-butyltindilaurate, di-n-butyltindiacetate, di-n-octyltin bis(monobutylmaleate), di - 2 - ethylhexyltin bis(2-ethylhexanoate), tri-n-butyltin acetonate, and di-butyltin diacetate; (2) organic tin salts such as stannous oleate and stannous octoate; and (3) mixtures thereof.

One of the features of this invention is that the use of amine catalysts is unnecessary in foam preparation thus obviating the need for expensive amine catalysts; however, the amine catalysts can be used, if desired.

Examples of dispersing agents or emulsifiers conventionally used in this art include polyethylene oxide phenyl ethers, blends of polyalcohol carboxylic acid esters, oil soluble sulfonates, siloxane-oxyalkylene block copolymers, and the like. The preferred emulsifiers for the purpose of the present invention are the siloxyaneoxyalkylene block copolymers of the general formula:

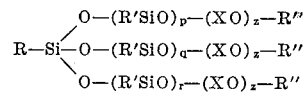

wherein R, R' and R" are $C_{1-18}$ alkyl radicals; $p$, $q$ and $r$ are integers of from 2 to 15 and —$(XO)_z$— is a polyoxyalkylene block where X is preferably an ethylene and/or propylene group resulting in polyoxyethylene-polyoxy-propylene blocks containing from 10 to 50 of each oxyalkylene unit. Such siloxane-oxyalkylene block copolymers are commercially available, one such product being offered under the trade name designation of "Silicon L–520" by Union Carbide Chemical Co., in which above general formula $R=CH_3$, $R'=C_2H_5$, $R''=C_4H_9$, $p=q=r=7$ and the block —$(XO)_z$— is a polyoxyethylene-polyoxypropylene block containing about 50 units of each oxyalkylene moiety.

In addition to the above mentioned conventionally used adjuvants, the rigid urethane foams known in the art can and usually do contain cross-linking agents, auxiliary blowing agents, pigments, and the like.

Discussions of the general background of polyether polyols and their relation to the polyurethane field can be found in Ferrigno, Rigid Plastic Foams, Reinhold Publishing Corporation, 1963, pp. 10 to 19, and Saunders et al., Polyurethanes, Chemistry and Technology, Part I. Chemistry, High Polymers, Vol. XVI, Interscience Publishers, 1962, pp. 32 to 44.

The following examples illustrate the present invention.

EXAMPLES I–XX

The following procedure was followed in all of the examples.

Triethanolamine was heated to 80° C. in a columnar cyclic polymerizer by means of a heat exchanger and a pump circulating liquor through the heat exchanger. The propylene oxide feed and co-initiator addition were conducted at 80° C. The co-initiator addition was completed in about 5 to about 30 minutes. Propylene oxide addition was continued for about 7 to about 20 hours depending on the amount introduced. The crude polyether was stripped of residual propylene oxide by a stream of nitrogen for about one to about one and a half hours at about 80° C. to about 125° C.

The rigid foam was prepared by the one-shot method, the first step involving thoroughly mixing the polyether, emulsifier, catalyst, blowing agent, and, optionally, a cross-linking agent at about 18° C. A tolylene diisocyanate composition was then mixed thoroughly with the above mixture for a period of about 20 to about 40 seconds. The foam was immediately poured into a mold and allowed to reach full height. It was permitted to age (cure) about 16 to about 24 hours before testing.

Proportions in parts by weight and properties are set forth in Table I below.

*Table I*

POLYETHER

| Example No. | Hydroxyl Number [1] | Polyol Equivalent Ratio [2] | Viscosity [3] | Co-Initiator | Triethanolamine | Propylene Oxide |
|---|---|---|---|---|---|---|
| | | Octol:triol | | Sucrose | | |
| 1 | 542 | 60:40 | 19,400 | 1,980 | 1,568 | 4,487 |
| 2 | 536 | 60:40 | 16,220 | 6,300 | 4,978 | 14,000 |
| 3 | 535 | 60:40 | 19,800 | 1,980 | 1,568 | 4,487 |
| 4 | 494 | 70:30 | 22,000 | 1,927 | 999 | 4,825 |
| 5 | 493 | 70:30 | 18,600 | 1,927 | 999 | 4,825 |
| 6 | 490 | 70:30 | 25,000 | 1,927 | 999 | 4,700 |
| 7 | 487 | 70:30 | 19,750 | 1,927 | 999 | 4,950 |
| 8 | 485 | 60:40 | 31,500 | 6,239 | 4,941 | 16,163 |
| 9 | 476 | 70:30 | 19,250 | 1,927 | 999 | 4,825 |
| 10 | 470 | 70:30 | 19,600 | 6,460 | 3,412 | 15,253 |
| 11 | 463 | 70:30 | 18,250 | 6,238 | 3,223 | 15,558 |
| | | Hexol:triol | | Sorbitol | | |
| 12 | 596 | 50:50 | 3,520 | 4,333 | 7,240 | 13,641 |
| 13 | 566 | 70:30 | 8,680 | 5,081 | 3,566 | 14,760 |
| 14 | 542 | 80:20 | 14,200 | 5,693 | 2,281 | 15,853 |
| 15 | 616 | 87:13 | 60,000 | 1,560 | 381 | 2,983 |
| 16 | 520 | 90:10 | 29,750 | 5,480 | 1,020 | 13,000 |
| | | Tetrol:triol | | Alphamethyl glucoside | | |
| 17 | 492 | 80:20 | 31,850 | 1,837 | 479 | 2,783 |
| 18 | 470 | 70:30 | 7,650 | 7,120 | 3,195 | 14,273 |
| 19 | 470 | 70:30 | 7,650 | 7,120 | 3,195 | 14,273 |
| 20 | 470 | 70:30 | 7,650 | 7,120 | 3,195 | 14,273 |

FOAM FORMULATION

| Ex. No. | Polyether | Tolylene Diisocyanate Composition [4] | Silicone Oil Emulsifier | Dibutyl Tin Dilaurate | Dimethylethanolamine | Trichloromonofluoromethane |
|---|---|---|---|---|---|---|
| 1 | 1,200 | 1,252 | 12 | 5 | | 37 |
| 2 | 1,200 | 1,230 | 12 | 5 | | 24 |
| 3 | 1,000 | 1,020 | 10 | 4 | | 30 |
| 4 | 1,200 | 1,140 | 12 | 5 | | 35 |
| 5 | 1,200 | 1,138 | 12 | 5 | | 35 |
| 6 | 1,200 | 1,132 | 12 | 5 | | 35 |
| 7 | 1,200 | 1,128 | 12 | 5 | | 35 |
| 8 | 1,000 | 943 | | 8 | | 35 |
| 9 | 1,200 | 1,100 | 12 | 5 | | 35 |
| 10 | 1,200 | 1,140 | 12 | 4 | | 35 |
| 11 | 1,200 | 1,100 | 12 | 4 | | 35 |
| 12 | 1,000 | 1,130 | 10 | 4 | | 35 |
| 13 | 1,000 | 1,070 | 10 | 4 | | 35 |
| 14 | 1,000 | 1,020 | 10 | 4 | | 35 |
| 15 | 1,000 | 1,160 | 10 | 4 | | 35 |
| 16 | 1,000 | 985 | 10 | 4 | | 35 |
| 17 | 1,000 | 879 | 10 | 4 | 10 | 25 |
| 18 | 1,000 | 906 | 10 | 4 | 10 | 25 |
| 19 | 1,000 | 906 | 10 | 4 | 10 | 25 |
| 20 | 1,000 | 906 | 10 | 4 | 10 | 25 |

See footnotes at end of table.

TABLE I—Continued
FOAM PROPERTIES

| Ex. No. | Density [5] | Primary Shrinkage [6] | Friability [7] | Dimensional Stability [8] |
|---|---|---|---|---|
| | 1.76 | 0 | G | 8 |
| | 2.33 | 0 | E | 8 |
| | 1.86 | 0 | G | 9 |
| | 1.97 | 2 | G | 6 |
| | 1.82 | 0 | G | 7 |
| | | 0 | E | 8 |
| | 2.01 | 0 | G | 8 |
| | 1.38 | 2 | E | 10 |
| | 1.99 | 0 | G | 6 |
| | 2.20 | <1 | G | 4 |
| | 2.10 | 0 | E | 5 |
| | 1.50 | 2 | | 5 |
| | 1.80 | 1 | | 4 |
| | 1.90 | 1 | | 5 |
| | 2.20 | 0 | | 5 |
| | 1.90 | 0 | | 6 |
| | 2.10 | 3 | E | 10 |
| | 2.10 | 1 | E | 9 |
| | 2.10 | 1 | G | 6 |
| | 2.00 | 1 | G | 9 |

[1] Hydroxyl number represents the number of milligrams of potassium hydroxide equivalent to the hydroxyl content of one gram of the polyether polyol (ASTM D 1638-59T).
[2] Polyol equivalent ratio is the ratio of equivalents of hydroxyl groups on the octol, hexol, tetrol molecules to equivalents of hydroxyl groups on the triol molecules.
[3] Viscosity is expressed in centipoises at 25° C. as determined by a Brookfield viscometer.
[4] The tolylene diisocyanate composition was prepared by the process described in co-pending application Serial No. 225,873, filed September 24, 1962, and had an amine equivalent of 106.
[5] Density is expressed in pounds per cubic foot.
[6] Primary shrinkage is the percent of volume loss which occurs during the cure of the foam.
[7] Friability is the tendency to "dust" or pulverize with handling. In (7) to (8), inclusive, =Good and E=Excellent.
[8] Dimensional stability is the percentage of volume increase of the foam during a 24 hour period at 70° C. and 100% relative humidity. Desirable dimensional stability is 10% or less.

It is apparent from the foregoing that the process for the preparation of the polyether of this invention avoids the use of a catalyst per se, eliminates the refining step, and can be carried out with existing plants and equipment. It was further determined that reaction times were about 2.5 to 10 times faster than the corresponding KOH catalyzed reactions, i.e., reaction times run from about 7 to about 20 hours for the subject process and about 50 to 70 hours for the KOH catalyzed reaction. In addition, use is made of lower cost materials such as triethanolamine and sucrose; expensive amine catalysts do not have to be used in the foam preparation unless desired; and water is no problem.

The foams produced in accordance with the present invention had a fine, uniform cell structure and desirable dimensional stability. Generally more than 95 percent of the cells are closed. The foams, when subjected to the flame test, were found to be non-melting and non-dripping.

We claim:
1. A method for the production of a polyether polyol composition which comprises admixing a co-initiator selected from the group consisting of sucrose, sorbitol, and alpha-methyl glucoside with triethanolamine in the proportion of about 55 to about 575 parts by weight co-initiator to about 100 parts by weight triethanolamine, passing propylene oxide in direct contact with said mixture of co-initiator and triethanolamine while maintaining the mixture at a temperature within the range of about 70° C. to about 140° C., and continuing the procedure until a polyether polyol composition having a hydroxyl number from about 400 to about 600 is obtained.

2. A method for the production of a polyether polyol composition which comprises admixing a co-initiator selected from the group consisting of sucrose, sorbitol, and alpha-methyl glucoside with triethanolamine in the proportion of about 140 to about 415 parts by weight co-initiator to about 100 parts by weight triethanolamine, passing propylene oxide in direct contact with said mixture of co-initiator and triethanolamine while maintaining the mixture at a temperature within the range of about 70° C. to about 100° C., and continuing the procedure until a polyether polyol composition having a hydroxyl number from about 450 to about 550 is obtained.

3. A polyether polyol composition prepared by a process comprising admixing a co-initiator selected from the group consisting of sucrose, sorbitol, and alpha-methyl glucoside with triethanolamine in the proportion of about 55 to about 575 parts by weight co-initiator to about 100 parts by weight triethanolamine, passing propylene oxide in direct contact with said mixture of co-initiator and triethanolamine while maintaining the mixture at a temperature within the range of about 60° C. to about 140° C., and continuing the procedure until a polyether polyol composition having a hydroxyl number from about 400 to about 600 is obtained.

4. A polyether polyol composition prepared by a process comprising admixing a co-initiator selected from the group consisting of sucrose, sorbitol, and alpha-methyl glucoside with triethanolamine in the proportion of about 140 to about 415 parts by weight co-initiator to about 100 parts by weight triethanolamine, passing propylene oxide in direct contact with said mixture of co-initiator and triethanolamine while maintaining the mixture at a temperature within the range of about 70° C. to about 100° C., and continuing the procedure until a polyether polyol composition having a hydroxyl number from about 450 to about 550 is obtained.

References Cited
UNITED STATES PATENTS 2,902,478  9/1959  Anderson _____ 260—209
3,225,028  12/1965  Nordgren _____ 260—209

LEWIS GOTTS, Primary Examiner.
J. BROWN, Assistant Examiner.